United States Patent [19]
Guo

[11] Patent Number: 5,618,455
[45] Date of Patent: Apr. 8, 1997

[54] ELECTRIC WELDING MACHINE

[76] Inventor: Guo M. Guo, No. 109, Alley 75, Lane 668, Yu Nung Road, Tainan City, Taiwan

[21] Appl. No.: 508,961

[22] Filed: Jul. 28, 1995

[51] Int. Cl.$^6$ .................................................. B23K 9/10
[52] U.S. Cl. .......................................................... 219/130.1
[58] Field of Search ........................... 219/130.1, 137 PS

[56] References Cited

U.S. PATENT DOCUMENTS

| | | | |
|---|---|---|---|
| 1,146,988 | 7/1915 | Arendt | 219/130.1 |
| 1,312,039 | 8/1919 | Meilink | 219/130.1 |
| 1,550,721 | 8/1925 | Von Henke | 219/130.1 |
| 2,036,233 | 4/1936 | Pakala | 219/137 PS |
| 2,173,450 | 9/1939 | Larsen et al. | 219/137 PS |
| 2,673,915 | 3/1954 | Steinert et al. | 219/130.1 |
| 4,251,710 | 2/1981 | Ortega-Aguirre et al. | 219/130.1 |
| 4,694,140 | 9/1987 | Wheeler et al. | 219/130.1 |

*Primary Examiner*—Clifford C. Shaw
*Attorney, Agent, or Firm*—Pro-Techtor International

[57] ABSTRACT

An electric welding machine consisting of a high-power resistor, a power transformer, and an inductor, wherein the high-power resistor is controlled to change the constant voltage of the power transformer so that the end voltage and end electric current of the electric welding machine provide a negative resistance characteristic for keeping the electric arc stable.

1 Claim, 9 Drawing Sheets

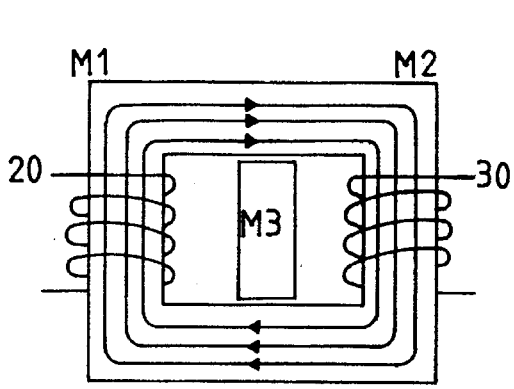
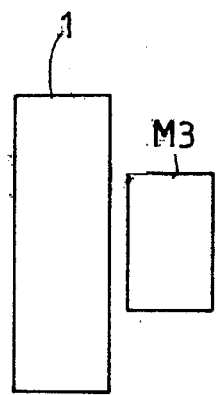
Fig.2a (Prior Art)  Fig.2a1 (Prior Art)
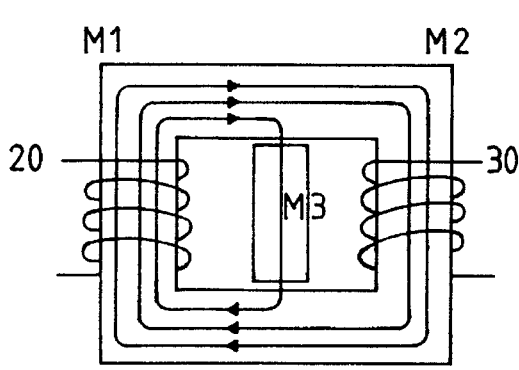
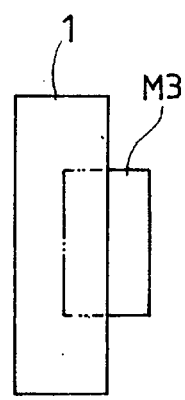
Fig.2b (Prior Art)  Fig.2b1 (Prior Art)
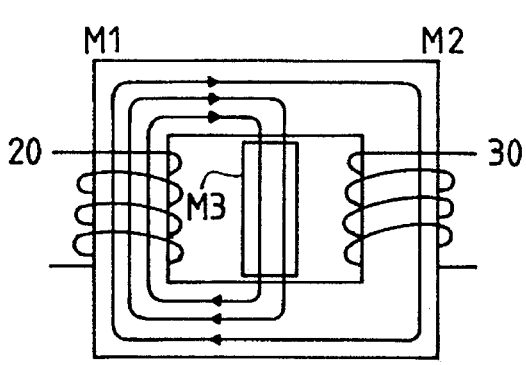
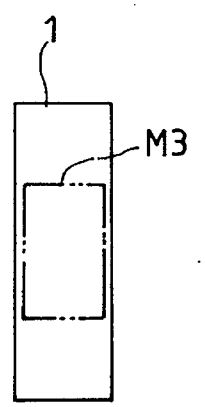
Fig.2c (Prior Art)  Fig.2c1 (Prior Art)

| MODEL | POWER OF TRANSFORMER | CURRENT AT PRIMARY SIDE |
|---|---|---|
| 150A | 10 KVA | 60A |
| 200A | 14 KVA | 66.6A |
| 300A | 21 KVA | 100A |
| 400A | 28 KVA | 123.3A |
| 500A | 35 KVA | 166.6A |

ELECTRIC WELDING MACHINE

BACKGROUND OF THE INVENTION

The present invention relates to electric welding machines, and relates more particularly to such an electric welding machine which uses a variable resistor to control the operation of an annular power transformer and an inductor so as to maintain the electric arc stiff during welding.

FIG. 1 shows a regular electric welding machine, which comprises a substantially rectangular transformer 10 and a movable iron core M3 at the center opening of the transformer 10 to close the magnetic line of force so as to limit electric current. The transformer 10 comprises an iron core, which consists of two iron core parts M1 and M2, a primary winding 20 and a secondary winding 30 respectively wound the iron core M1 and M2. The central iron core, namely, the movable iron core M3 is driven by a handle to move forward or backward in the transformer 10, and therefore the output current is regulated. The relationship between the position of the movable iron core M3 and the output current is shown in FIG. 2a, 2b, and 2c. When the movable iron core M3 is moved out of the transformer 10 as shown in FIG. 2a, the magnetic line of force from M1 is transferred completely to M2, and the electric welding machine receives the maximum value of electric current. When the movable iron core M3 is partially moved into the transformer 10 as shown in FIG. 2b, the magnetic line of force from M1 partially passes through M3, therefore less magnetic line of force is induced by M2, and less electric current is outputted. The value of output current is relatively reduced when the movable iron core M3 moves backwards inside the transformer 10. When the movable iron core M3 is completely moved back inside the transformer 10 as shown in FIG. 2c, the magnetic line of force from M1 is completely blocked up between M1 and M2, the output current reaches the minimum value. Because the movable iron core M3 blocks up a part of the magnetic line of force in between M1 and M2, the remainder of the magnetic line of force is transferred to M2. Because the induced magnetic line of force is constant, a constant value of electric current is given to the electric welding machine. However, this structure of electric welding machine is still not satisfactory in function. Because the primary winding 20 and the secondary winding 30 are respectively wound on the transformer 10 at two opposite sides, the course of the magnetic line of force is long. The size of the iron cores must be greatly increased. Therefore, this structure of electric welding machine is big and heavy (for example, an electric welding machine of 300A weights over 120 kgs). Because the passage of the magnetic line of force is long, the energy loss is high, and the efficiency is low. When not in welding, the loss of static current is quite high (the utilization percent is about 45%, the efficiency is about 45%, and the static current is about within 10–15A). FIG. 3 is a voltage-current curve obtained from tests made on the aforesaid structure of electric welding machine, showing the relationship between the end voltage and the end current, in which A indicates the arc current; B indicates the arc voltage. Furthermore, the transformer 10 is complicated and expensive to manufacture. The iron core M1 and M2 is made by: processing silicon steel sheets into substantially U-shaped elements, and I-shaped elements, then alternatively connecting the U-shaped elements and I-shaped elements into shape. This iron core production procedure takes much working time, and produces much waste material.

SUMMARY OF THE INVENTION

The present invention has been accomplished to provide an electric welding machine which eliminates the aforesaid drawbacks. It is one object of the present invention to provide an electric welding machine which keeps the electric arc stiff during welding. It is another object of the present invention to provide an electric welding machine which provides a broad application range. It is still another object of the present invention to provide an electric welding machine which produces low static current. It is still another object of the present invention to provide an electric welding machine which is easy and inexpensive to manufacture. It is still another object of the present invention to provide an electric welding machine which is compact and lightweight.

To achieve the aforesaid objects, there is provided an electric welding machine comprised of a high-power resistor, a power transformer, and an inductor, wherein the high-power resistor is controlled to change the constant voltage of the power transformer so that the end voltage and end electric current of the electric welding machine provide a negative resistance characteristic for keeping the electric arc stable.

BRIEF DESCRIPTION OF THE DRAWINGS

FIGS. 2a, 2a1, 2b, 2b1, 2c, and 2c1 show different positions of the movable iron core of the electric welding machine of FIG. 1 relative to different output currents;

DETAILED DESCRIPTION OF THE PREFERRED EMBODIMENT

Figure 1:
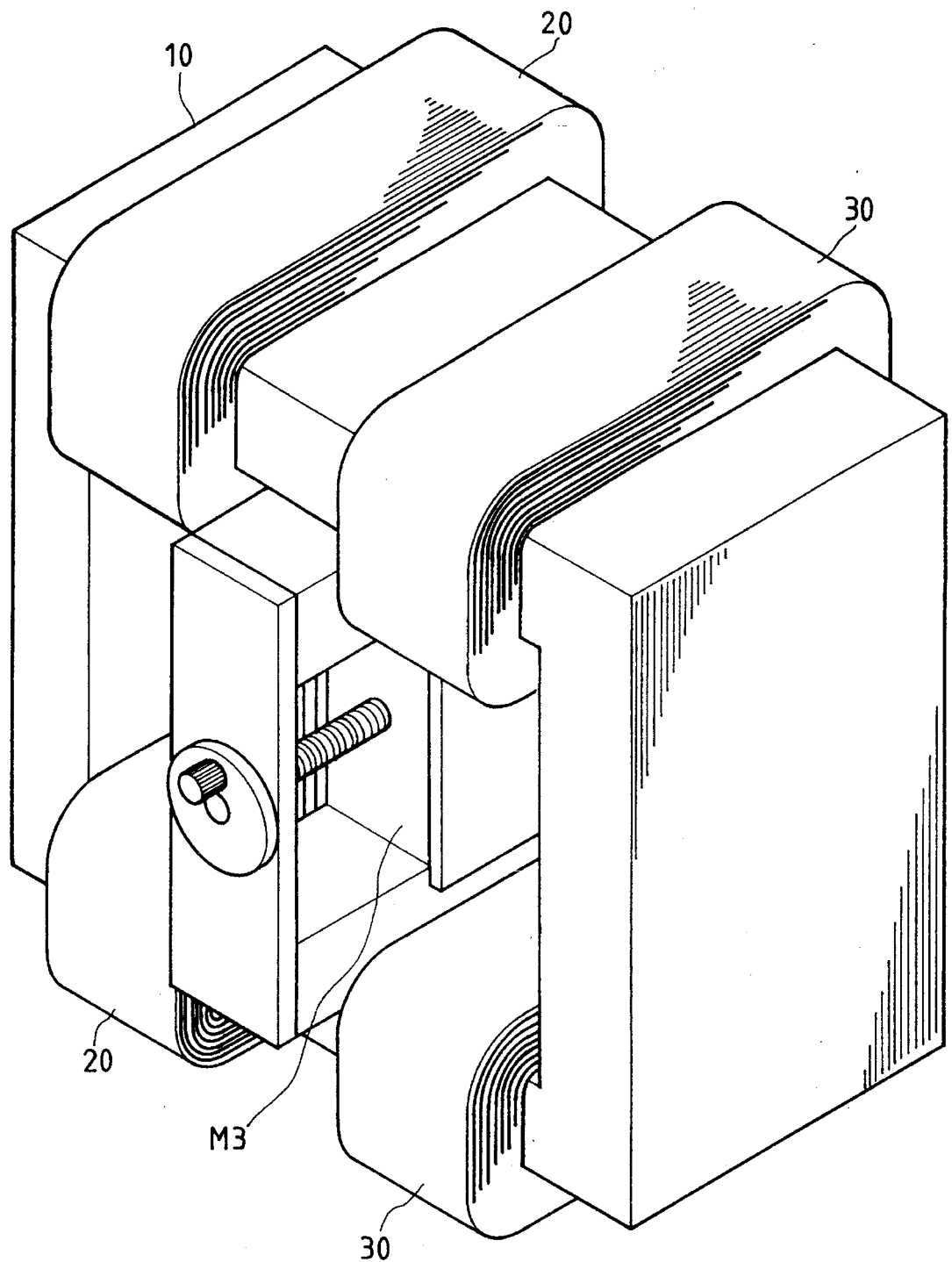
FIG. 1 shows the mainframe of an electric welding machine with a movable iron core according to the prior art.
Figure 3:
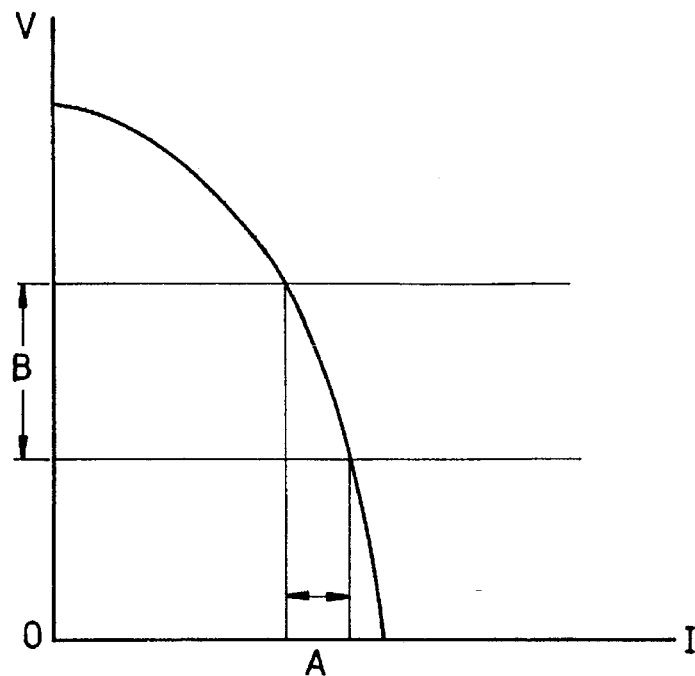
FIG. 3 is a voltage-current curve showing the relationship between the end voltage and the end current according to the prior art.
Figure 4:
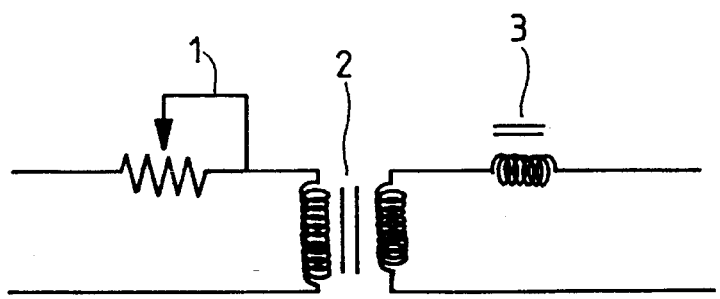
FIG. 4 is a circuit diagram according to the present invention.

Referring to FIG. 4, an electric welding machine in accordance with the present invention is generally comprised of a high-power resistor 1, a power transformer 2, and an inductor 3. The high-power resistor 1 can be a variable resistor.

Figure 5:
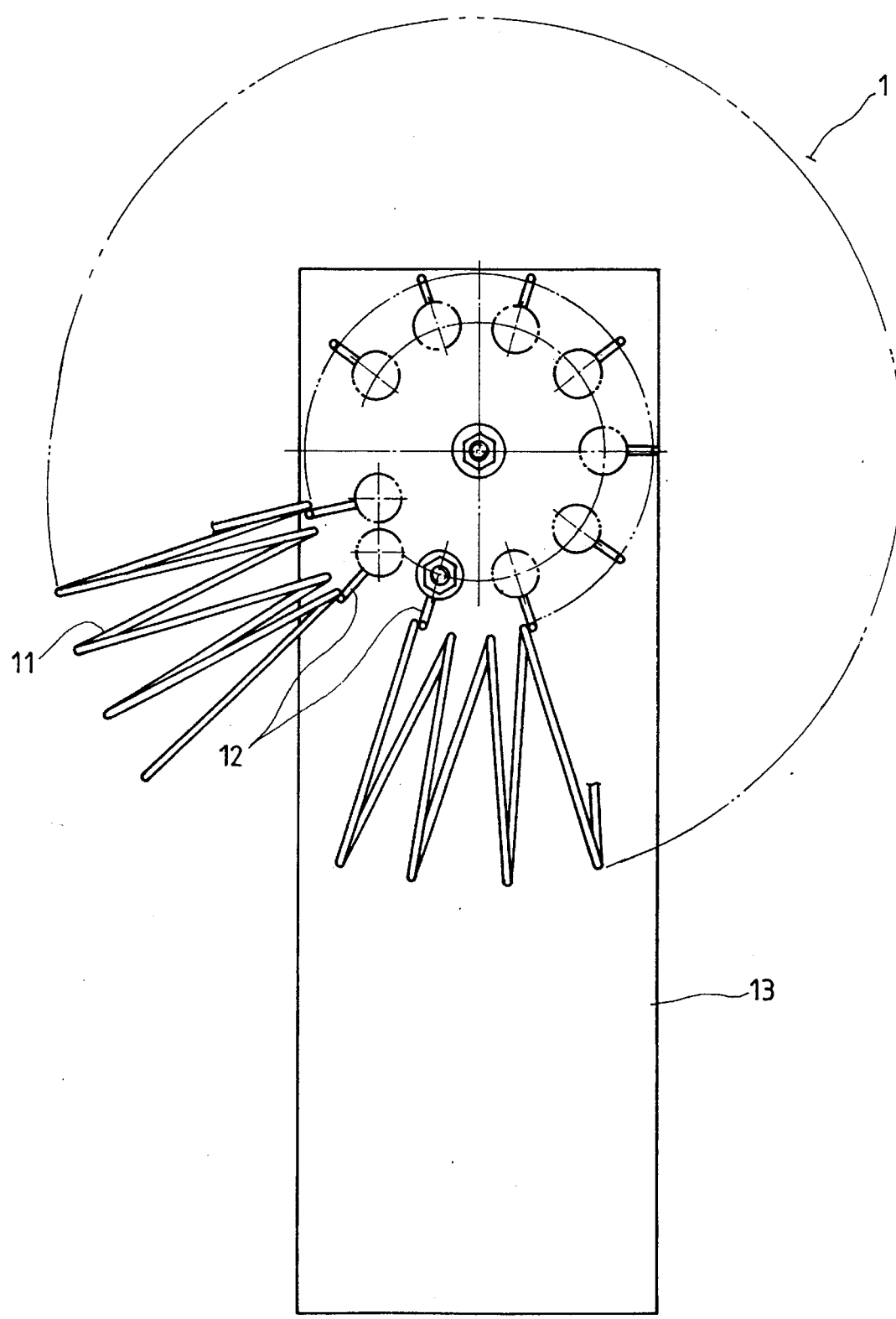
FIG. 5 is a front view of a high-power resistor according to the present invention.
Figure 6:
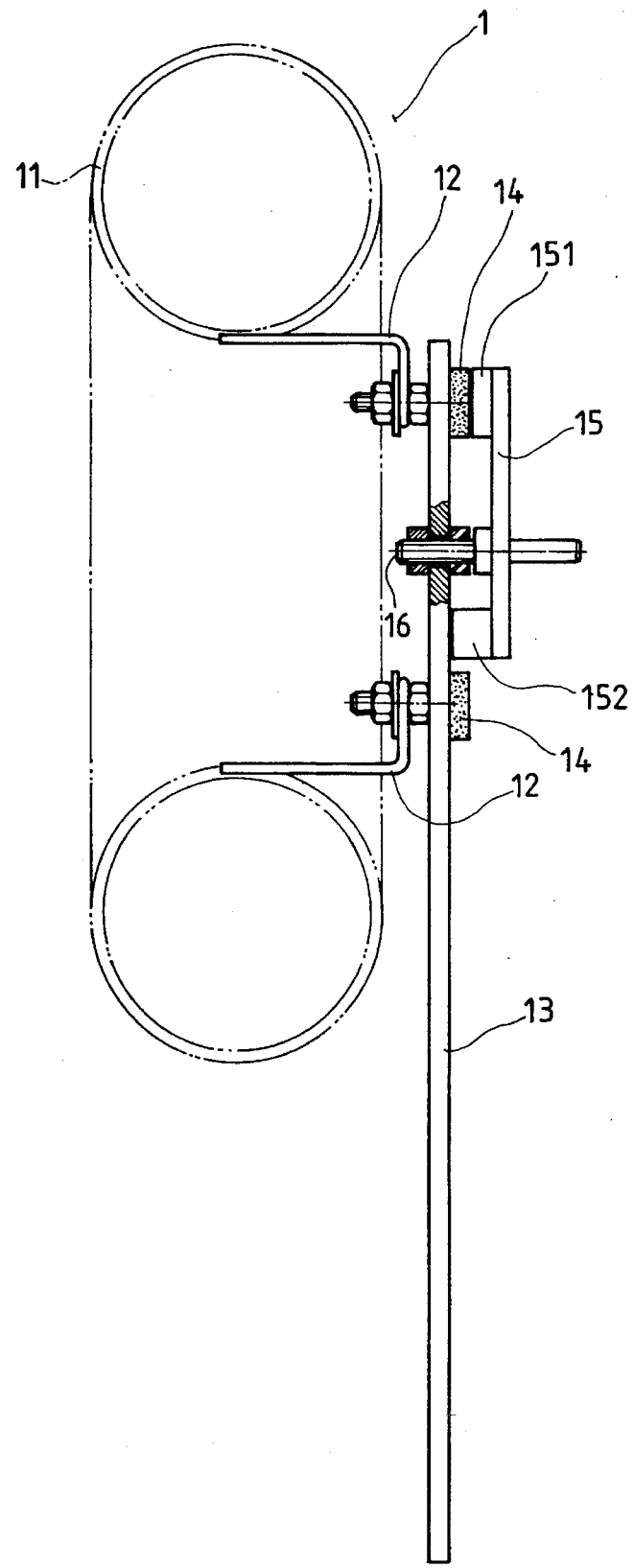
FIG. 6 is a side view in section of the high-power resistor shown in FIG. 5.
Figure 7:
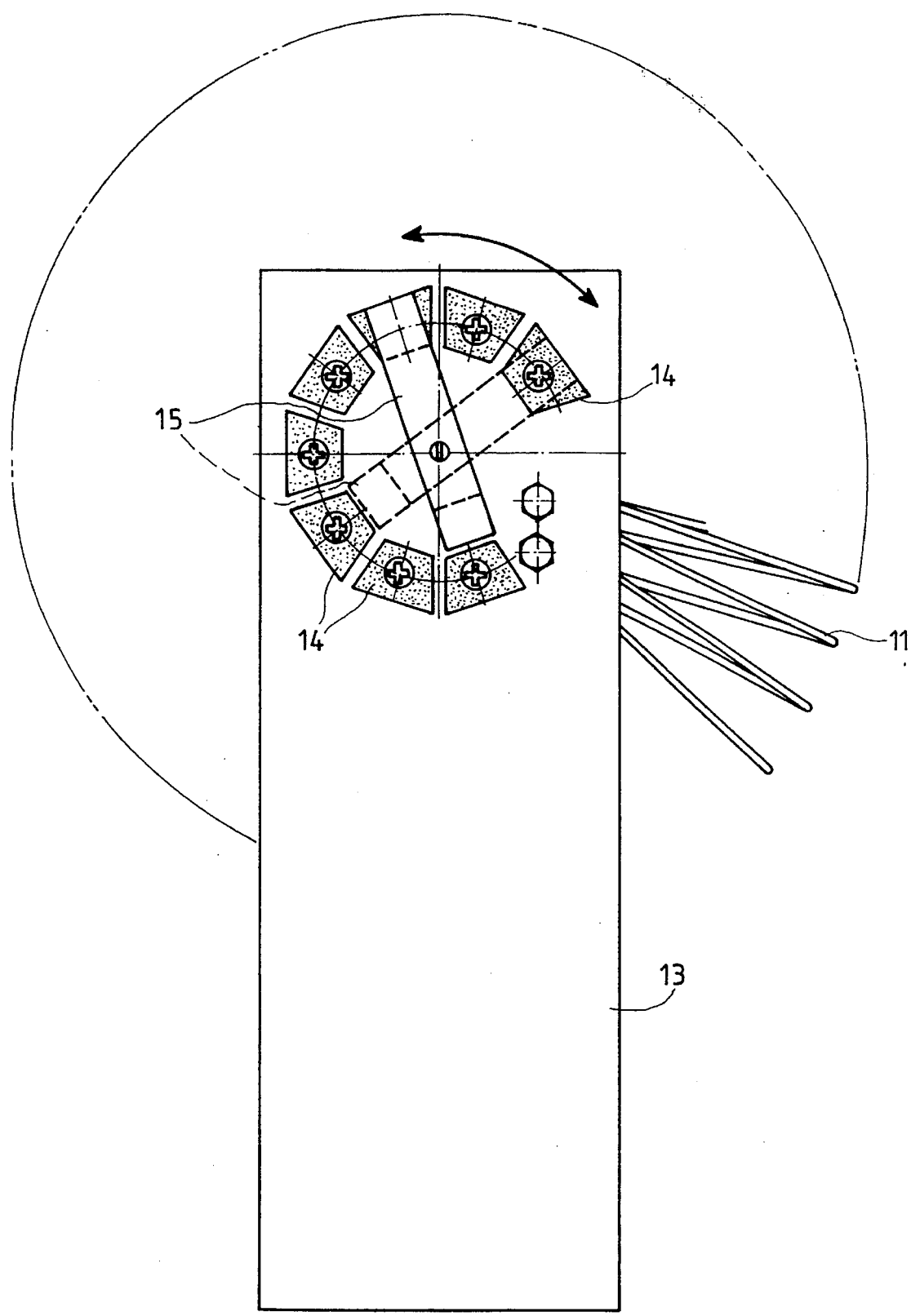
FIG. 7 is a rear side view of the high-power resistor shown in FIG. 5, showing the rotating member rotated.

Referring to FIGS. 5, 6, and 7, the high-power resistor 1 comprises a partition plate 13, a bearing 16 mounted on the partition plate 13, a plurality of metal guide blocks 14 mounted on the partition plate 13 at one side and spaced around the bearing 16, a resistance coil 11 having a plurality of lead wires 12 respectively fastened to the partition plate 13 at an opposite side and connected to the metal guide blocks 14, and a rotating member 15 revolvably mounted on the bearing 16 and having a metal guide plate 151 and a plastic block 152 at two opposite ends. The metal guide plate 151 acts with one metal guide block 14. By turning the rotating member 15 to shift the metal guide plate 151 of the rotating member 15 from one metal guide block 14 to another, the impedance of the variable resistor 1 is changed.

Figure 8:
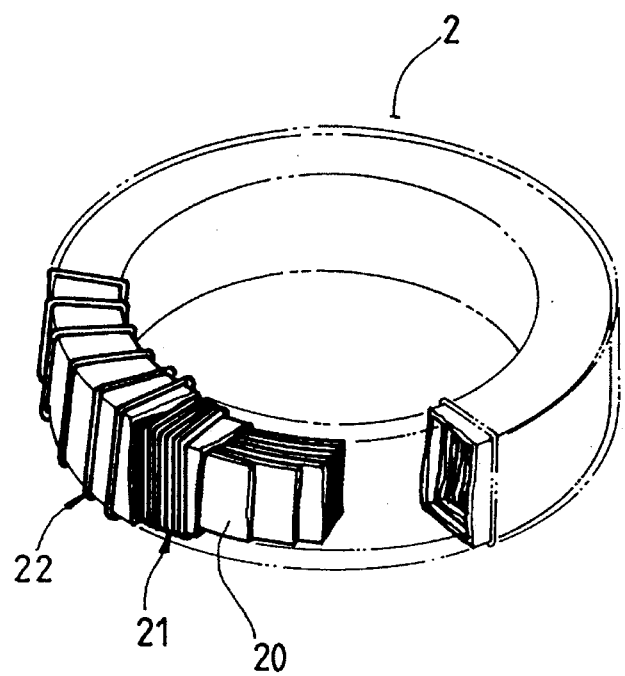
FIG. 8 is a cutaway view of an annular power transformer according to the present invention.

Referring to FIG. 8, the power transformer 2 is preferably made of annular shape which achieves the satisfactory performance. By using quality silicon steel plates and winding wires, the performance of the power transformer can be greatly improved. As illustrated, the power transformer 2 comprises an annular iron core 20, a primary winding 21 wound around the periphery of the annular iron core 20, and a secondary winding 22 wound around the primary winding 21. Of course, insulative means such as insulative paper must be installed in between the annular iron core 20 and the primary winding 21, as well as between the primary winding 21 and the secondary winding 22. This design permits the magnetic line of force of the primary winding 21 to be directly coupled to the secondary winding 22. Because the passage of the magnetic line of force is shortened, magnetic loss is minimized, and static current is small (as low as below 0.5A). The annular iron core 20 is made by winding a narrow silicon steel sheet into shape. The inductor 3 can also be made from an annular iron core.

Figure 9:
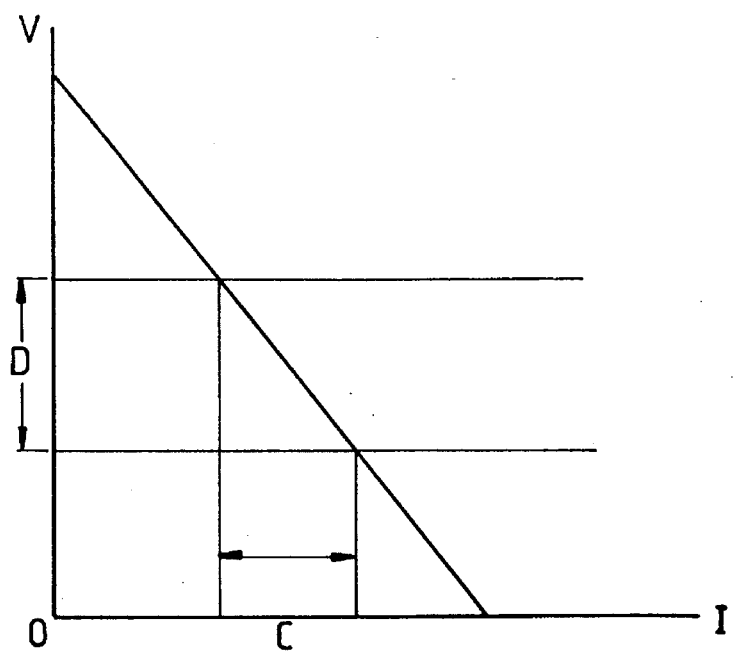
FIG. 9 is a voltage-current curve showing the relationship between the end voltage and the end current according to the present invention.
Figure 10:
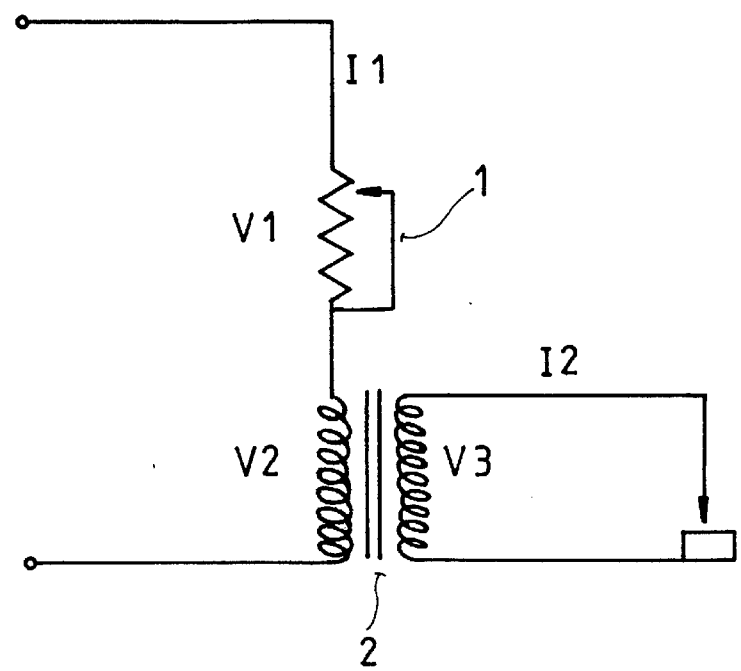
FIG. 10 is an equivalent circuit diagram according to the present invention, showing the electric welding machine operated at a high current welding mode.
Figure 11:
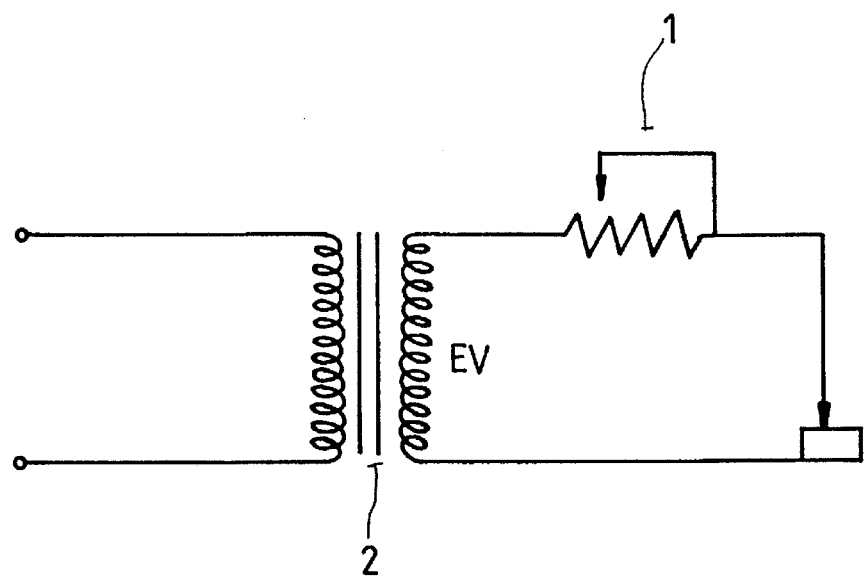
FIG. 11 is another equivalent circuit diagram according to the present invention, showing the electric welding machine operated at a low current welding mode.

Because the output voltage of the annular power transformer 2 is constant, and its output current is variable subject to the impedance of the load, it cannot be directly used in the electric welding machine. If the annular power transformer 2 is directly used in the electric welding machine to weld a workpiece with a small welding rod, the small welding rod will be quickly melted, and the workpiece will be pierced by the electric arc. In case a big welding rod is used, the annular power transformer 2 will be burnt due to overload. Therefore, the aforesaid high-power resistor 1 is installed to control the operation of the power transformer 2 as shown in FIGS. 9, 10, and 11. FIG. 9 is a voltage-current curve showing the relationship between the end voltage (V) and the end current (I), in which "C" indicates arc current; "D" indicates arc voltage. As indicated, the voltage and the current provide a negative resistance characteristic, i.e., the current becomes low when the voltage is high; the current becomes high when the voltage is low. The welding curve is obtained by connecting different loads to the secondary side, then marking the respective voltage values and current values thus obtained from the secondary side on a coordinate, and then connecting the marks on the coordinate into a curve.

Referring to FIG. 10, when a high current is employed for welding the high-power resistor 1 is disposed at the side of the primary winding 21 of the annular power transformer 2. As the feeding speed of the welding rod is accelerated, the electric arc is shortened, and the value of electric current at the secondary side I2 is increased, at the same time the value of electric current at the primary side I1 is also increased, and the voltage V1 at the high-power resistor 1 is relatively increased, and therefore the voltage V2 at the annular power transformer 2 drops, causing the voltage V3 at the secondary side to drop. When the voltage V3 at the secondary side drops, the value of electric current I2 at the secondary side is relatively lowered to compensate the rising of the original electric current, and therefore the values of voltage and electric current are maintained stable (feedback compensation).

Referring to FIG. 11, when a low current is employed for welding, the high-power resistor 1 is disposed at the side of the secondary coil 22 of the annular power transformer 2. When the load end touches the workpiece to form a short circuit, the voltage drops at the high-power resistor 1, and the value of electric current is changed to EV/R (the EV value is normally within 70–80). Therefore, when the high-power resistor 1 is disposed at the side of the secondary coil 22 of the annular power transformer 2, its adjusting range is relatively increased. By changing the position of the high-power resistor 1 between the primary coil 21 and the secondary coil 22 subject to the value of electric current employed, the application range of the present invention is broadened.

Figures 12, 13:
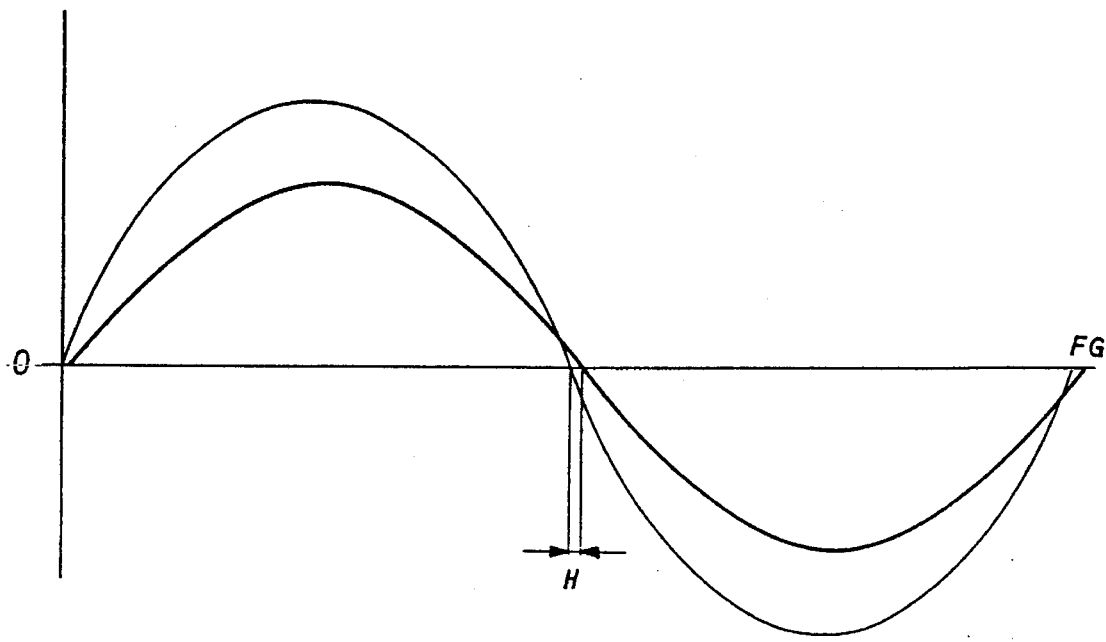
FIG. 12 is an action curve of an inductor according to the present invention.
FIG. 13 is a product chart showing different models of electric welding machines according to the present invention.

FIG. 13 shows different models of electric welding machines from 150A to 500A (200A and 300A are most popularly accepted welding current in market). When a 150A model is used, the maximum current at the primary side is 50A, and the resistance wire of 50A, 3 mm is used.

As indicated, the electric welding machine provides a broad range of end voltage and end current to fit different welding materials, and automatically adjusts the value of electric current subject to the feeding speed, by means of the operation of the high-power resistor 1 in controlling the annular power transformer 2, to maintain a stable electric arc. Because the high-power resistor 1 does not produce a magnetic force, the electric welding machine does not vibrate during its operation. Furthermore, because the inductor 13 can preserve electric energy, it provides electric energy to keep the electric arc stiff when electric current is transiently zeroed. FIG. 12 shows the action curve of the inductor 3, in which the curve F indicates the waveform of electric current; the curve G indicates the waveform of voltage; H shows the angle of phase lag.

It is to be understood that the drawings are designed for purposes of illustration only and are not intended as a definition of the limits and scope of the invention disclosed.

I claim:

1. An electric welding machine comprising:

a high-power variable resistor, a power transformer to output a constant voltage to provide an end voltage and an end electric current of said welding machine, said constant voltage of said transformer being varied by a user changing an impedance of said high-power variable resistor, and an inductor to minimize variations in said end electric current, wherein said high-power resistor comprises a partition plate, a bearing mounted on said partition plate, a plurality of metal guide blocks mounted on said partition plate at one side and spaced around said bearing, a resistance coil having a plurality of lead wires fastened to said partition plate and connected to said metal guide blocks, and a rotating member revolvably mounted on said bearing and having a metal guide plate at a first end and a plastic block at a second end, said metal guide plate contacts one of said metal guide blocks, said user changes said impedance of said high-power variable resistor by choosing which of said metal guide blocks to place into contact with said metal guide plate, said contact being established by said user rotating said rotating member.

* * * * *